United States Patent Office 2,704,584
Patented Mar. 22, 1955

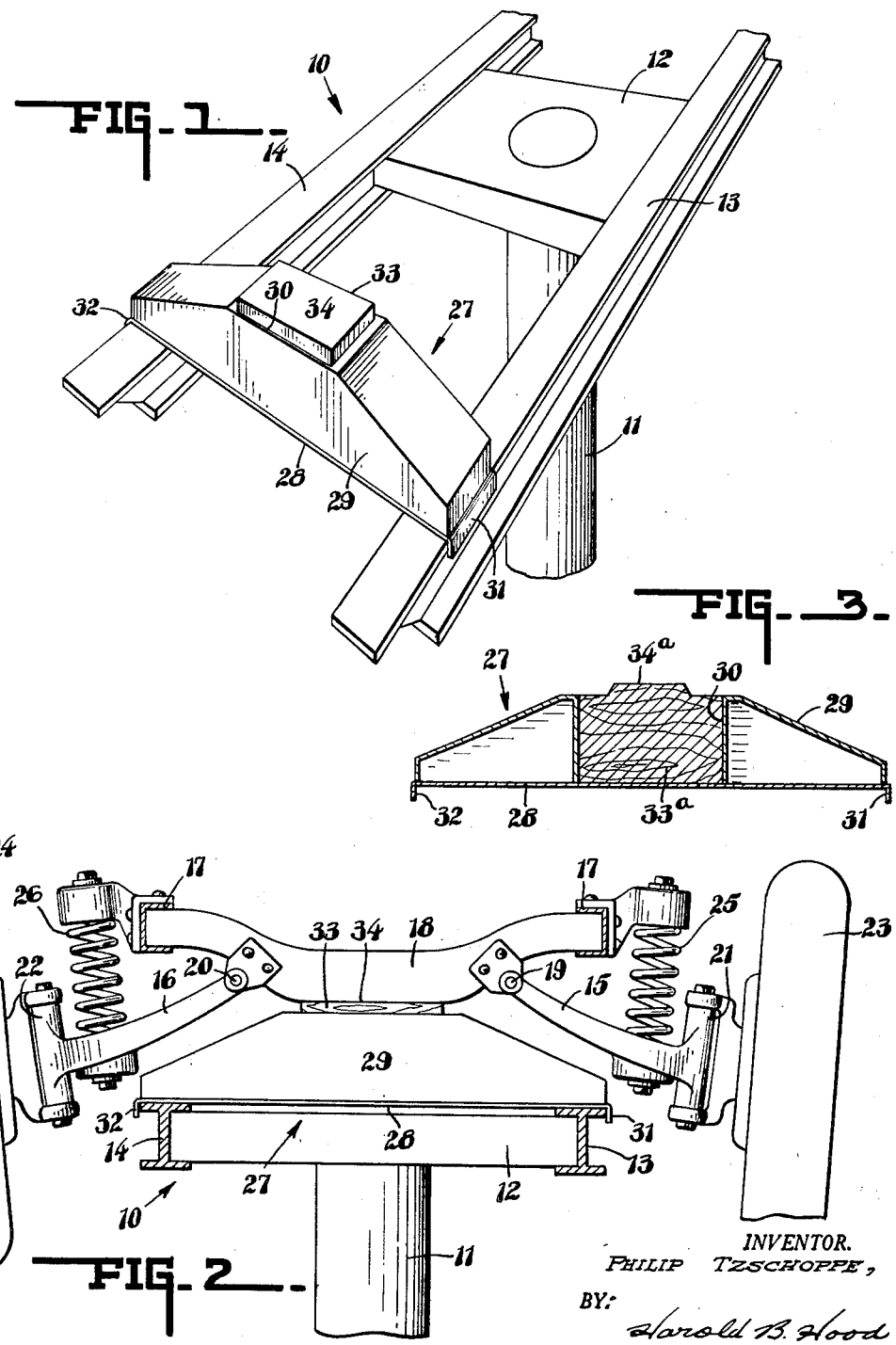

2,704,584
SAFETY BLOCK FOR AUTOMOBILE LIFTS OR THE LIKE

Philip Tzschoppe, Chandler, Ind.

Application April 16, 1951, Serial No. 221,268

1 Claim. (Cl. 187—8.75)

This invention relates to automobile lifts and is primarily concerned with the provision of a more efficient means of lubrication and repair and safe means for supporting a vehicle on such a lift.

In recent years, automobiles have been constructed with front wheel suspensions in which each front wheel is supported independently on a yoke pivoted near the longitudinal center of the chassis to a "cross-member." When an automobile rests on its tires, the pressure is on one side of all bearings. During lubrication of an automobile, while standing on its tires, it has been found that the grease goes primarily to the point of no-load, which is contrary to the desired result.

In an attempt to offset this difficulty, the so-called "free-wheeling" lift was devised whereby the automobile is lifted by its axles, the wheels hanging free. Such a lift comprises a pair of spaced parallel rails arranged to be straddled by the automobile to be lifted; these rails being located to engage the front wheel supporting yokes. While, with such a lift, the load is removed from the wheel bearings, obviously, the bearings on which the wheel supporting yokes are secured to the "cross member" are still under normal load. No advantage is gained, therefore, by the use of such a lift insofar as the yoke bearings are concerned. The primary object of the present invention, therefore, is to provide a means whereby an automobile may be supported on such a "free-wheeling" lift with all load removed from the wheel and yoke bearings.

A further difficulty with the "free-wheeling" type of lift arises from the fact that a vehicle thereon is supported through a metal-to-metal contact between the lift rails and the automobile chassis; and it is not uncommon for a vehicle so supported to slip or shift, sometimes to the extent that the vehicle topples from the lift. This hazard is so well recognized that it is reflected in extremely high insurance rates for the "free-wheeling" type lift. Therefore, a further object of the present invention is the elimination of this metal-to-metal supporting engagement, thereby reducing the potential danger of accident.

Ancillary objects of the invention will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Fig. 1 is a perspective view of a portion of a "free-wheeling" type lift with an embodiment of my invention associated therewith;

Fig. 2 is a transverse cross-sectional view of the lift as shown in Fig. 1, showing a typical type of automobile front wheel suspension supported thereon; and Fig. 3 is a longitudinal cross-sectional view of the structure of Fig. 1, illustrating an additional feature provided thereby.

Referring more specifically to the drawings, I have illustrated a conventional type "free-wheeling" lift 10, having a central piston 11 carrying a cross-head 12. Secured to the cross-head 12 is a pair of laterally-spaced, longitudinally-extending, parallel rails 13 and 14. In conventional practice, an automobile is positioned to straddle these rails and, as the lift is raised, the rails contact the rear axle and the front wheel suspension yokes 15 and 16 to lift the vehicle. My invention deals specifically with improved means for supporting the front of the vehicle; and therefore only the front wheels and directly associated parts of an automobile are shown in the drawings.

In the majority of modern automobiles, the chassis 17 is provided with a front "cross-member" 18. Pivoted to this cross-member, on suitable bearings 19 and 20, are yokes 15 and 16, usually taking the form of A-frames. Yokes 15 and 16 are pivoted to "cross-member" 18 near the center thereof and carry, at their outer ends, king-pin supports 21 and 22. The front wheels 23 and 24 are supported on king-pins carried in said supports, and springs 25 and 26 provide cushioning means between said yokes and chassis 17, as is clearly shown in Fig. 2.

As said before, the usual practice is to allow the rails 13 and 14 to contact the yokes 15 and 16 during the lifting operation. From an inspection of Fig. 2, it will be obvious that such a practice results in the load of the automobile being supported on the bearings 19 and 20 and springs 25 and 26. The optimum condition desired, however, is the removal of all load from bearings 19 and 20 and springs 25 and 26. When this condition is achieved, bearings 19 and 20 may be properly lubricated and the entire front end suspension may be operated upon for the removal and replacement of worn parts and the like.

To accomplish this optimum condition, I have provided a safety-block 27 for use with such a "free-wheeling" type lift. Safety-block 27 has a substantially rectangular base plate 28 for spanning engagement with lift rails 13 and 14. Supported thereon is a frame 29 upstanding from said base plate and rigidly fixed thereto by means of welding, or the like. Frame 29 provides, near the center thereof, a socket 30 opening outwardly from the base plate 28.

At the opposite ends of base plate 28, I provide a pair of substantially parallel guide flanges 31 and 32. These flanges depend from said plate, opposite from frame 29, at substantially right angles to plate 28 and constitute means whereby the safety block 27 is rendered laterally stationary but longitudinally movable with respect to lift rails 13 and 14, when safety-block 27 is associated with lift 10. This manner of supporting safety-block 27 on rails 13 and 14 provides a simple means whereby the block may be brought into proper registry with the automobile chassis "cross-member."

Into socket 30, I have placed a cushion block 33. This cushion is so proportioned that it bears against base plate 28 and projects slightly above frame 29. The area 34, thus exposed, provides a seating surface for contact with the "cross-member" of an automobile chassis. This seating surface 34 is designed to extend transversely, relative to the lift 10, so as not to interfere with yoke bearings 19 and 20—merely to engage the portion of "cross-member" 18 between said bearings. Thus the entire front wheel suspension of an automobile is allowed to hang free when my invention is employed.

While my invention so far described constitutes a substantial improvement over conventional structures as described above, I prefer to further increase its safety by forming cushion block 33 of non-metallic material, the purpose being to eliminate the metal-to-metal contact between the automobile chassis and the lift rails normally encountered in this type lift. Materials which have proved satisfactory are wood, hard rubber, etc., the only requirement being that the material used have a coefficient of friction substantially greater than that of metals commonly used in such devices.

The distance between adjacent ends of yokes 15 and 16 varies among different makes of automobiles. In order to increase the utility of my device and render it usable with practically all makes of automobiles, I have provided for use with safety-block 27 a plurality of cushion blocks 33. As shown in Fig. 3, one of the plurality of cushion blocks 33a is provided with a seating surface 34a having a transverse dimension less than that of block 33. Similar cushion blocks may be provided with seating surfaces having still different transverse dimensions, either greater or less than those of block 33 of Fig. 1. The principal purpose for this provision arises from the desirability of providing the greatest lateral stability possible for each type automobile. Obviously, use of cushion block 33a with the automobile illustrated in Fig. 2, will not provide the degree of lateral stability which will result from the use of cushion block 33; while the block 33 could not be used for an automobile having yoke pivot points much closer together than those shown in Fig. 2. Therefore, I have provided a plurality of selectivity interchangeable cushion blocks, respectively designed to accord with the structures of various makes of automobiles, which will render my device substantially universally usable.

In addition to those improvements heretofore explained, a further advantage flows from the use of my invention. According to conventional practice, the removal and replacement of front wheel shock absorbers is accomplished while the automobile remains standing on the floor. A jack is placed under the front cross-member of the automobile to allow completely free suspension of the front wheel supporting mechanism. With the use of my invention, shock absorbers may be changed while the car is held at a distance above the floor most convenient for the mechanic, thus eliminating the necessity for the mechanic to lie on the floor beneath the automobile.

I claim as my invention:

For use with a free-wheeling type vehicle lift having a pair of laterally spaced, substantially parallel rails, a safety block comprising a base plate adapted to span said rails, flange means on said plate engageable with said rails to restrict lateral movement of said base plate relative to said rails, housing means supported on said base plate and providing a top wall means inclined upwardly from opposite ends of said plate toward the midpoint thereof, said top wall means being centrally interrupted to provide an upwardly-opening socket, and a cushion removably secured in said socket and projecting upwardly therefrom, said cushion providing an upwardly-presented load-supporting surface located above the uppermost level of said top wall means.

References Cited in the file of this patent

UNITED STATES PATENTS

| | | |
|---|---|---|
| 1,784,554 | Stukenborg | Dec. 9, 1930 |
| 1,915,024 | Logette et al. | June 20, 1933 |
| 2,037,531 | Moore | Apr. 4, 1936 |
| 2,045,173 | Baird | June 23, 1936 |
| 2,080,481 | Holt | May 18, 1937 |
| 2,158,399 | Carter | May 16, 1939 |
| 2,229,113 | Mizer | Jan. 21, 1941 |
| 2,556,796 | Care et al. | June 12, 1951 |
| 2,637,522 | Wallace | May 5, 1953 |

FOREIGN PATENTS

| | | |
|---|---|---|
| 626,497 | Germany | Feb. 28, 1936 |
| 802,202 | France | June 6, 1936 |